(12) United States Patent
Chung et al.

(10) Patent No.: US 9,291,811 B2
(45) Date of Patent: Mar. 22, 2016

(54) ELECTROWETTING DEVICE AND METHOD FOR IMPROVING RESPONSE SPEED OF ELECTROWETTING DEVICE

(75) Inventors: Sang-Kug Chung, Gyeonggi-do (KR); Jeong-Byung Chae, Gyeonggi-do (KR); Jeong-Hyun Lee, Gyeongsangbuk-do (KR)

(73) Assignee: Myongji University Industry and Academia Cooperation Foundation, Gyeonggi-do (KR)

( * ) Notice: Subject to any disclaimer, the term of this patent is extended or adjusted under 35 U.S.C. 154(b) by 76 days.

(21) Appl. No.: 14/129,093

(22) PCT Filed: Apr. 30, 2012

(86) PCT No.: PCT/KR2012/003335
§ 371 (c)(1),
(2), (4) Date: Mar. 17, 2014

(87) PCT Pub. No.: WO2012/176980
PCT Pub. Date: Dec. 27, 2012

(65) Prior Publication Data
US 2015/0036205 A1 Feb. 5, 2015

(30) Foreign Application Priority Data
Jun. 24, 2011 (KR) .......... 10-2011-0061509

(51) Int. Cl.
G02B 26/00 (2006.01)
G02B 3/12 (2006.01)
G02B 3/14 (2006.01)

(52) U.S. Cl.
CPC .......... *G02B 26/005* (2013.01); *G02B 3/14* (2013.01)

(58) Field of Classification Search
CPC .................. G02B 26/004; G02B 26/06
USPC .......... 359/290–292, 226.3, 228, 665
See application file for complete search history.

(56) References Cited

U.S. PATENT DOCUMENTS 6,911,132 B2 * 6/2005 Pamula et al. .......... 204/600

FOREIGN PATENT DOCUMENTS

| KR | 1020050085243 A | 8/2005 |
| KR | 1020070120773 A | 12/2007 |
| KR | 1020080071250 A | 8/2008 |

* cited by examiner

*Primary Examiner* — Tuyen Tra
(74) *Attorney, Agent, or Firm* — TechLaw LLP

(57) ABSTRACT

According to certain embodiments of the invention, an electrowetting device and a method for improving the response speed of an electrowetting device may be provided. The electrowetting device can includes: an electrode; an insulation film including a dielectric material that is coated over the electrode; a droplet positioned over the insulation film; and a power control unit configured to control a voltage applied to the electrode, where the power control unit reaches a particular contact angle by applying a first voltage that is higher than a second voltage corresponding to the particular contact angle, and applies the second voltage once the particular contact angle is reached. According to certain embodiments of the invention, the response speed of an electrowetting device can be improved by applying different voltages according to the contact angle of the droplet in an electrowetting device.

5 Claims, 10 Drawing Sheets

ELECTROWETTING DEVICE AND METHOD FOR IMPROVING RESPONSE SPEED OF ELECTROWETTING DEVICE

CROSS-REFERENCE TO RELATED APPLICATIONS

This application is a National Phase Application of PCT International Application No. PCT/KR2012/003335, which was filed on Apr. 30, 2012, and which claims priority from Korean Patent Application No. 10-2011-0061509 filed with the Korean Intellectual Property Office on Jun. 24, 2011. The disclosures of the above patent applications are incorporated herein by reference in their entirety.

BACKGROUND

1. Technical Field

Embodiments of the present invention relate to an electrowetting device having a fast response speed and to a method for improving the response speed of an electrowetting device.

2. Description of the Related Art

When a droplet of electrolyte is placed on an electrode and electrical energy is supplied to the electrode-solution interface, a change in interfacial tension occurs, and the contact angle of the droplet is changed. This phenomenon is referred to as electrowetting.

The principle of electrowetting is utilized in various fields, such as liquid lenses, display devices, memory devices, switches, optical devices, liquid magnets, MEMS (micro-electro-mechanical systems), and the like.

Here, a liquid lens is a lens using from a fluid, where the curve of the lens is obtained by the interface between a fluid and an oil. By using the electrowetting phenomenon to modify this interface, it is possible to change the focus of the lens. This technology provides such advantages as a smaller size, a faster response time, and lower power consumption, etc.

Also, a display device using electrowetting may include, from the bottom upwards: a bottom electrode, an insulation layer, a hydrophobic coating, and a pixel wall, where a colored oil may be placed over the hydrophobic coating and water may be added thereto. Such a device may express a pixel by adjusting the area of the oil. That is, light can be made to pass through when a voltage is applied to the oil such that the oil dispersed in each pixel gathers together, and light can be blocked when the applied voltage is removed and the oil blocks the pixel again.

In these various products that utilize electrowetting, a fast response speed is required of the electrowetting device. For example, in order to implement a real-time video clip in an electrowetting display device, a fast response speed is crucial.

SUMMARY

To resolve the problems in the related art above, an aspect of the invention aims to provide an electrowetting device and a method for improving the response speed of an electrowetting device that utilize a multiple voltage supply method.

To achieve the objective above, an embodiment of the invention provides an electrowetting device that includes: an electrode; an insulation film including a dielectric material that is coated over the electrode; a droplet positioned over the insulation film; and a power control unit configured to control a voltage applied to the electrode. The power control unit reaches a particular contact angle by applying a first voltage that is higher than a second voltage corresponding to the particular contact angle, and applies the second voltage once the particular contact angle is reached.

Here, the first voltage may represent a maximum voltage within a range that does not destroy the insulation film or the droplet.

Also, a threshold voltage extractor unit can be additionally included, which is configured to increase a voltage applied to the electrode until the contact angle of the droplet is no longer changed, and extract the voltage applied at a point when the contact angle of the droplet is no longer changed as the first voltage.

Another embodiment of the invention provides a method for improving a response speed of an electrowetting device, which operates based on the electrowetting principle of modifying a contact angle of a droplet by applying a voltage to an electrode coated with an insulation film, where the method includes: applying a first voltage to the droplet until a particular contact angle of the droplet is reached; and applying a second voltage to maintain the contact angle of the droplet when the particular contact angle of the droplet is reached, the first voltage being higher than the second voltage.

Yet another embodiment of the invention provides an electrowetting device that includes: a first electrode; a second electrode disposed in a direction facing the first electrode; a first insulation layer formed covering the first electrode; a second insulation layer formed covering the second electrode: a support arranged on a bottom surface between the first electrode and the second electrode; a droplet positioned over the support; and a power control unit configured to control a voltage applied to the first electrode and the second electrode, where the power control unit applies multiple voltages to the first electrode for controlling a first contact angle of the droplet in a direction of contact between the first insulation layer and the droplet and applies multiple voltages to the second electrode for controlling a second contact angle of the droplet in a direction of contact between the second insulation layer and the droplet.

Here, the power control unit may apply a first threshold voltage to the first electrode until the first contact angle desired by a user is reached and may apply a voltage for maintaining the first contact angle once the first contact angle is reached, and the power control unit may apply a second threshold voltage to the second electrode until the second contact angle desired by the user is reached and may apply a voltage for maintaining the second contact angle once the second contact angle is reached, where the first threshold voltage represents a maximum voltage within a range that does not destroy the first insulation film or the droplet, and the second threshold voltage represents a maximum voltage within a range that does not destroy the second insulation film or the droplet.

According to certain embodiments of the invention, the response speed of an electrowetting device can be improved by applying different voltages according to the contact angle of the droplet in an electrowetting device.

Additional objectives, aspects and advantages of the present invention will be set forth in part in the description which follows, and in part will be obvious from the description, or may be learned by practice of the invention.

DETAILED DESCRIPTION

Figure 1:
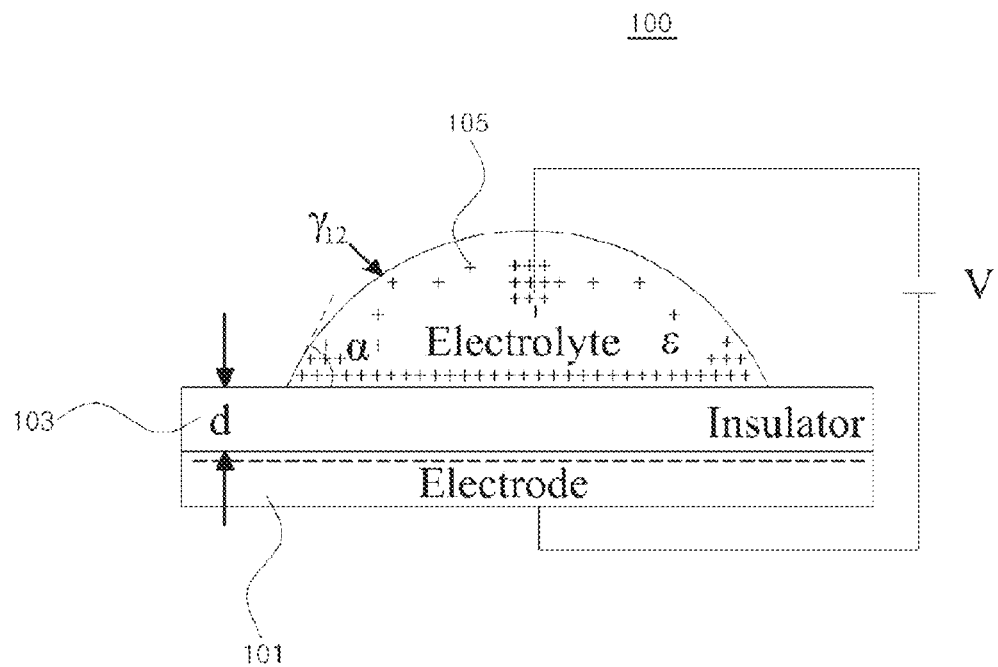
FIG. 1 illustrates an example of an electrowetting device, intended for explaining the phenomenon of electrowetting.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings.

The present invention relates to an electrowetting device for improving response speed and to a method of improving the response speed of an electrowetting device. Thus, a brief overview is first provided of the principle of electrowetting as used in an embodiment of the invention.

Electrowetting refers to the phenomenon in which applying electrical energy to the electrode-solution interface, when a droplet of electrolyte is placed on an electrode, causes a change in interfacial tension, which in turn causes a change in the contact angle of the droplet. The contact angle of the droplet will vary according to the intensity of the electrical energy, and therefore a user can apply electrical energy to the electrode with different intensities to obtain a desired contact angle of the droplet.

Here, the electrical double layer of the electrode-droplet interface cannot withstand a high voltage, so that a change in contact angle sufficient for activating the droplet may not be obtained. Thus, electrowetting-on-dielectric (EWOD) was proposed, which involves applying an insulation film including a dielectric material between the electrode and the droplet. In EWOD, a dielectric material is applied on the electrode, to prevent the droplet from undergoing electrolysis and enable the electrical double layer at the electrode-droplet interface to withstand a high voltage.

FIG. 1 illustrates an example of an electrowetting device, intended for explaining the phenomenon of electrowetting.

Referring to FIG. 1, the electrowetting device 100 can include an electrode 101, and an insulation film 103 that includes a dielectric material and is coated over the electrode 101. After a hydrophilic droplet 105 that includes an electrolyte is dropped onto the insulation film 103, an external voltage may be applied to the electrode 101 to change the contact angle (a) of the droplet 105.

Here, the contact angle (a) resulting from applying the voltage can be expressed as Equation 1 shown below, based on the Lippmann-Young equation.

$$\cos \alpha(V) = \cos \alpha(0) + \frac{\varepsilon_0 \varepsilon}{2\gamma_{12}d}V^2 \qquad [\text{Equation 1}]$$

Here, $\alpha(0)$ represents the contact angle when there is no voltage applied, $\alpha(V)$ represents the contact angle when a voltage V is applied, $\varepsilon_0$ represents the permittivity of the insulation film 103 when there is no voltage applied, $\varepsilon$ represents the permittivity of the insulation film 103 when a voltage V is applied, $\gamma_{12}$ represents the interfacial tension at the fluid-droplet interface, and d represents the thickness of the insulation film 103.

According to the Lippmann-Young equation, a wider range for the change in contact angle can be obtained with a higher voltage and a smaller thickness of the insulation film 103. However, although Equation 1 relates to the relationship between the voltage V and the thickness d of the insulation film 103, there is no consideration of the time required for changing to a desired contact angle, i.e. the response speed of the electrowetting. That is, response speed was not an important factor until recently, but as various devices begin to utilize the electrowetting phenomenon, a fast response speed has become important.

Below, a description is provided of the relationship between the intensity of a voltage applied to the electrode 101 and the response speed, followed by a method for improving the response speed.

Figure 2A:
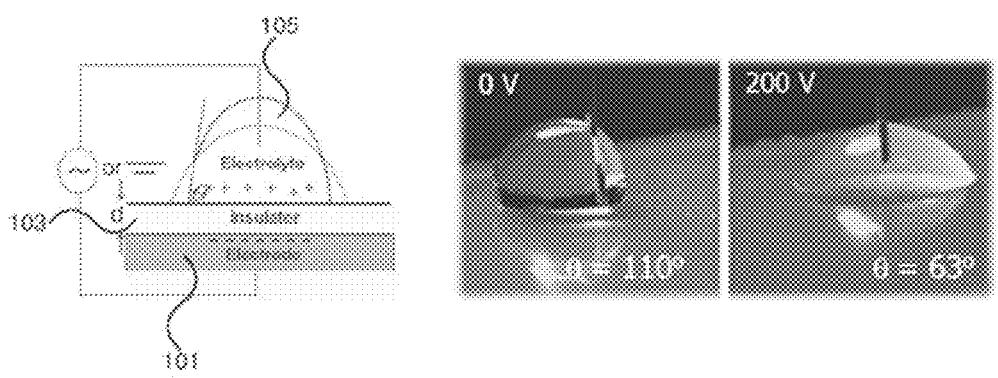
FIG. 2A and FIG. 2B illustrate examples of changes in contact angle according to the voltage applied to the electrode, according to an embodiment of the invention.
Figure 2B:
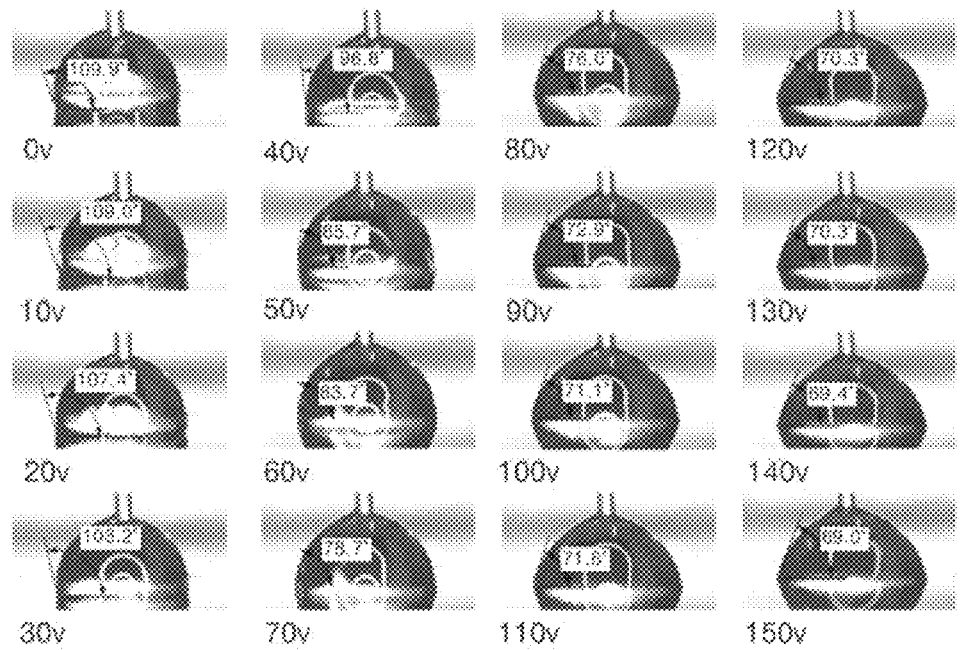
Figure 3:
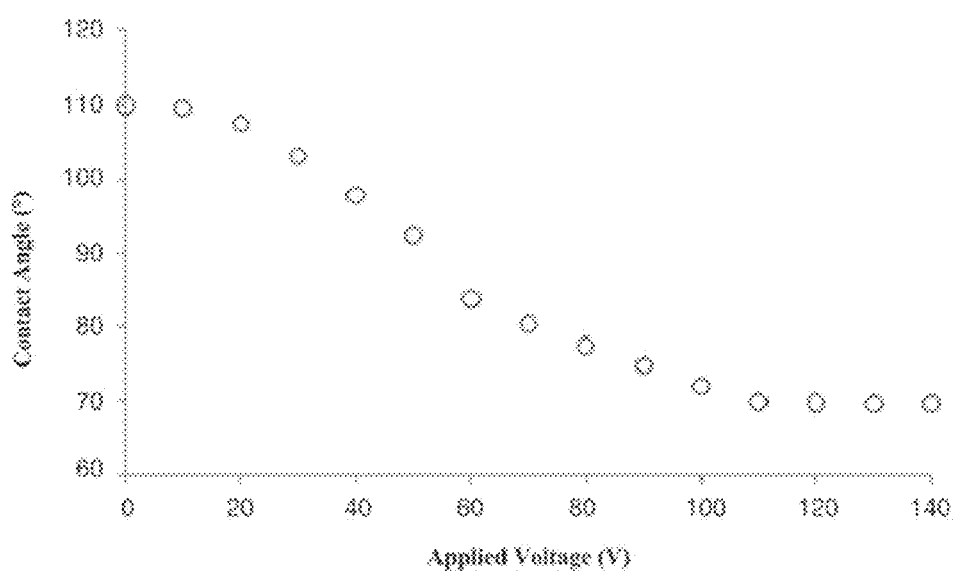
FIG. 3 is a graph illustrating the changes in contact angle according to the applied voltage, according to an embodiment of the invention.

FIG. 2A and FIG. 2B illustrate examples of changes in contact angle according to the voltage applied to the electrode, according to an embodiment of the invention, and FIG. 3 is a graph illustrating the changes in contact angle according to the applied voltage, according to an embodiment of the invention.

Referring to FIG. 2A and FIG. 2B, when an increased voltage is applied to the electrode 101, the range within which the contact angle can change may be broadened and the contact angle of the droplet 105 may be decreased, as already described above.

Here, although Equation 1 stipulates that the contact angle should decrease for an increase in voltage applied to the electrode 101, it can be seen from FIG. 3 that there exists a threshold point, with the contact angle no longer changed at a particular voltage or higher.

One of the reasons for the occurrence of such a threshold point can be that, when a voltage greater than the threshold voltage is applied to the electrode 101, the insulation film 103 or the droplet 105 may not withstand the high voltage and may be destroyed.

Therefore, for a stable operation of the electrowetting device 100, it may be necessary to apply to the droplet 105 a voltage lower than or equal to the threshold voltage.

In the following descriptions, the voltage at the threshold point where an increase in the voltage applied to the electrode 101 no longer changes the contact angle will be referred to as the threshold voltage.

Figure 4:
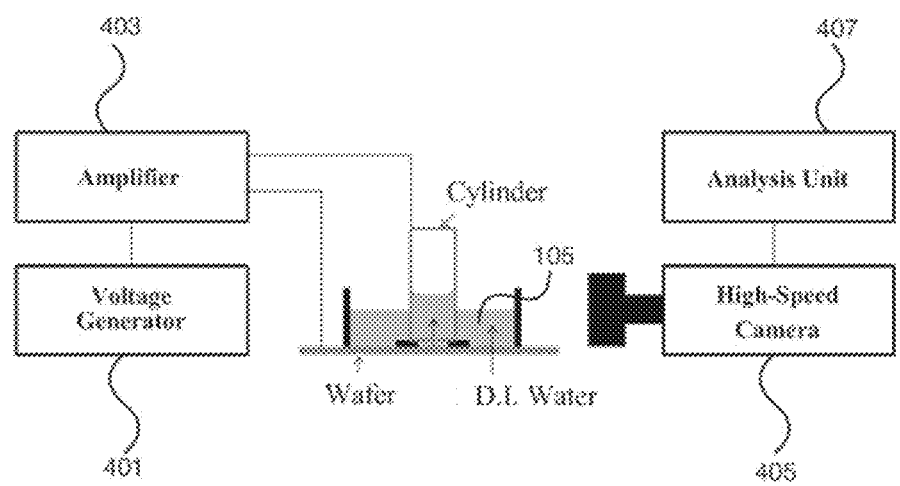
FIG. 4 illustrates an example of a device for measuring response speed, intended for explaining a response speed according to the voltage applied to an electrowetting device according to an embodiment of the invention.

FIG. 4 illustrates an example of a device for measuring response speed, intended for explaining a response speed according to the voltage applied to an electrowetting device according to an embodiment of the invention.

The response speed measurement device 400 can include a voltage generator 401, an amplifier 403, a high-speed camera 405, and an analysis unit 407.

The voltage generated at the voltage generator 401 may be amplified to voltages of different intensities by the amplifier 403, and the amplified voltages may be applied to the electrode 101.

As a voltage is applied to the electrode 101, the droplet 105 may rise along the cylinder, and an image can be captured of the rising droplet 105 by using the high-speed camera 405.

The analysis unit 407 may analyze the image obtained by the high-speed camera 405 to obtain the time it takes for the droplet 105 to reach a particular height when a particular voltage is applied to the electrode 101. That is, the analysis unit 407 can detect the response speed.

Figure 5:
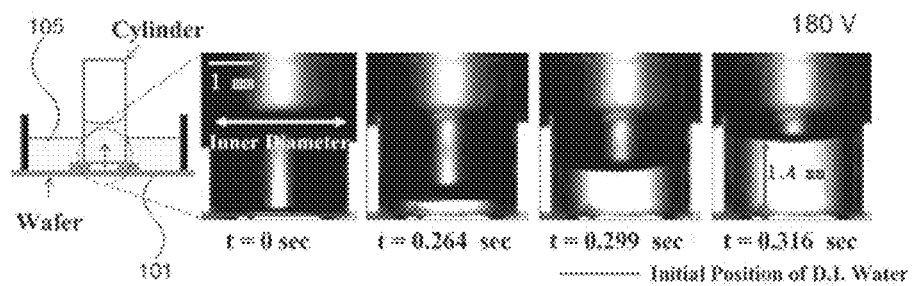
FIG. 5 illustrates an example of a droplet rising along a cylinder when a particular voltage is applied to the electrode according to an embodiment of the invention.

FIG. 5 illustrates an example of a droplet rising along a cylinder when a particular voltage is applied to the electrode according to an embodiment of the invention.

Referring to FIG. 5, it can be seen that, when a voltage of 180V is applied, the droplet 105 rises up to the height of 1.4 mm, and that the time it takes for the droplet 105 to reach this height is 0.316 seconds.

Figure 6A:
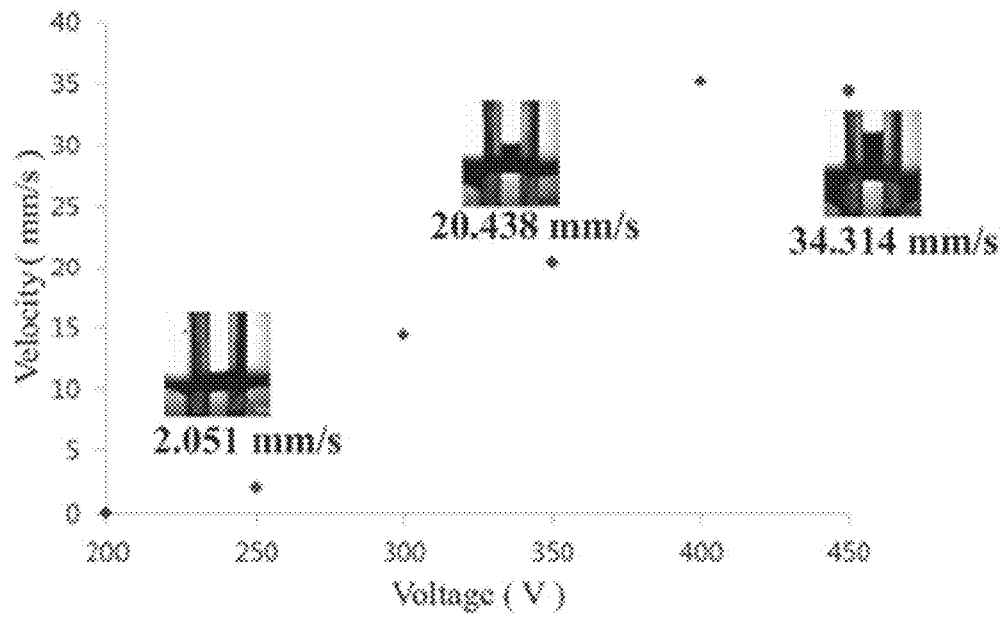
FIG. 6A and FIG. 6B are graphs illustrating the speeds by which deionized water rises according to the voltage applied, according to an embodiment of the invention.
Figure 6B:
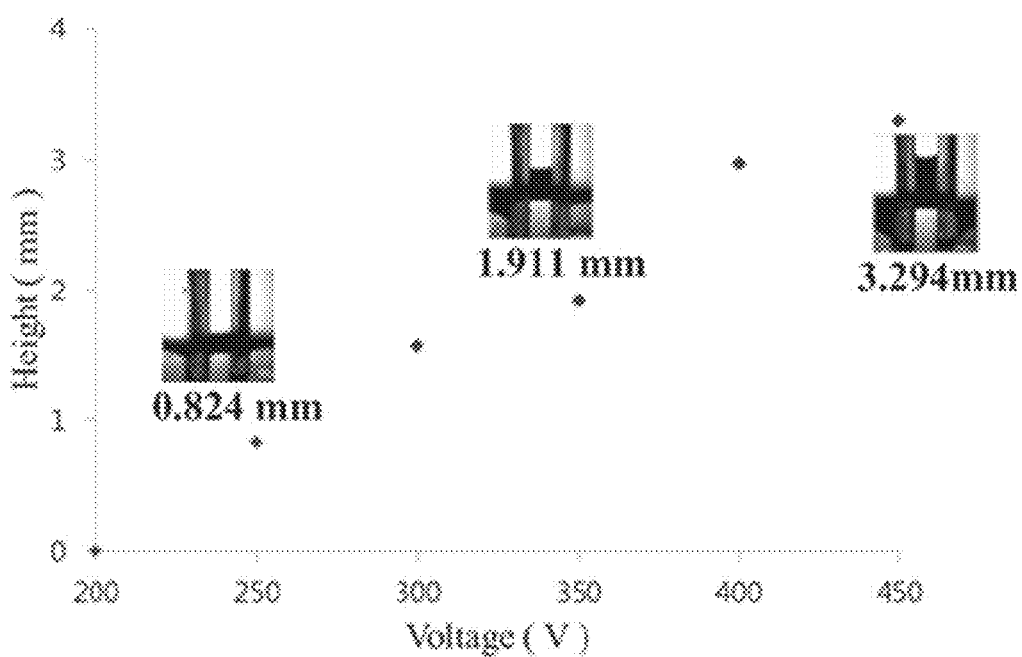

FIG. 6A and FIG. 6B are graphs illustrating the speeds and heights achieved by the deionized water according to the voltage applied, according to an embodiment of the invention.

FIG. 6A is a graph illustrating the velocity of the rising of the droplet according to the voltage applied, and it can be seen that the rising velocity of the droplet 105 is proportional to the voltage applied to the electrode 101. That is, the higher the voltage applied to the electrode 101, the higher the velocity by which the droplet 105 rises. Here, it can also be seen that the rising velocity no longer increases for voltages higher than the threshold point of 400 V.

FIG. 6B is a graph illustrating the height to which the droplet 105 rises according to the voltage applied, and it can be seen that an increase in the voltage applied to the electrode 101 also results in an increase in the height to which the droplet 105 rises.

From FIG. 4, FIG. 5, and FIGS. 6A and 6B, it can be seen that increasing the intensity of the voltage applied to the electrode 101 also leads to an increase in the speed by which the contact angle of the droplet 105 is changed.

Therefore, according to an embodiment of the invention, the response speed of the electrowetting device 100 can be increased by applying to the electrode 101 a threshold voltage and a voltage for maintaining the contact angle desired by the user with a time difference.

To be more specific, a threshold voltage can be applied to the electrode 101 until the contact angle of the droplet 105 desired by the user is reached, and when the contact angle of the droplet 105 desired by the user is obtained, a voltage for maintaining the contact angle of the droplet 105 can be applied to the electrode 101, so that the response speed of the electrowetting device 100 may be improved.

Figure 7:
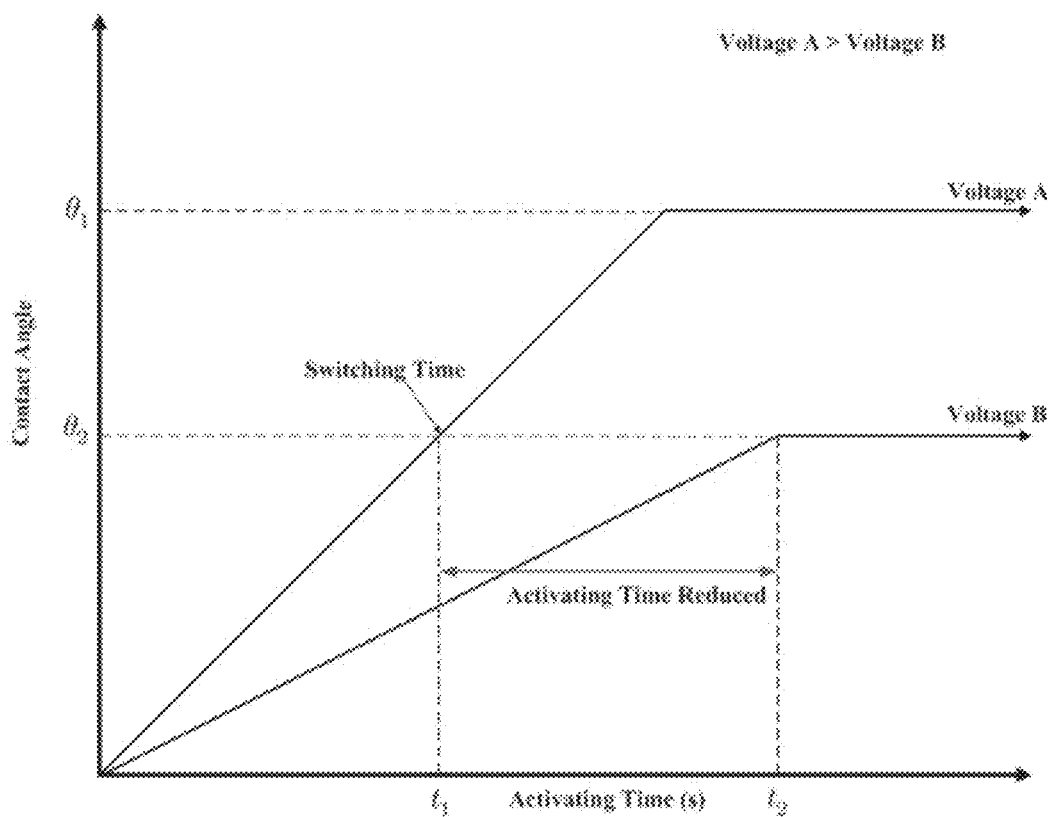
FIG. 7 is a graph illustrating the activating time of an electrowetting device when multiple voltages are applied according to an embodiment of the invention.

FIG. 7 is a graph illustrating the activating time of an electrowetting device when multiple voltages are applied according to an embodiment of the invention.

Referring to FIG. 7, if only voltage B is applied to the electrode 101, then the activating time $t_2$ may be required to obtain the contact angle $\theta_2$ of the droplet 105 desired by the user. However, if the threshold voltage A is first applied to the electrode 101, and voltage B for maintaining the contact angle $\theta_2$ is applied to the electrode 101 at the instant the contact angle reaches $\theta_2$, then the activating time can be shortened to $t_1$. That is, the response time can be reduced by $(t_2-t_1)$.

Figure 8:
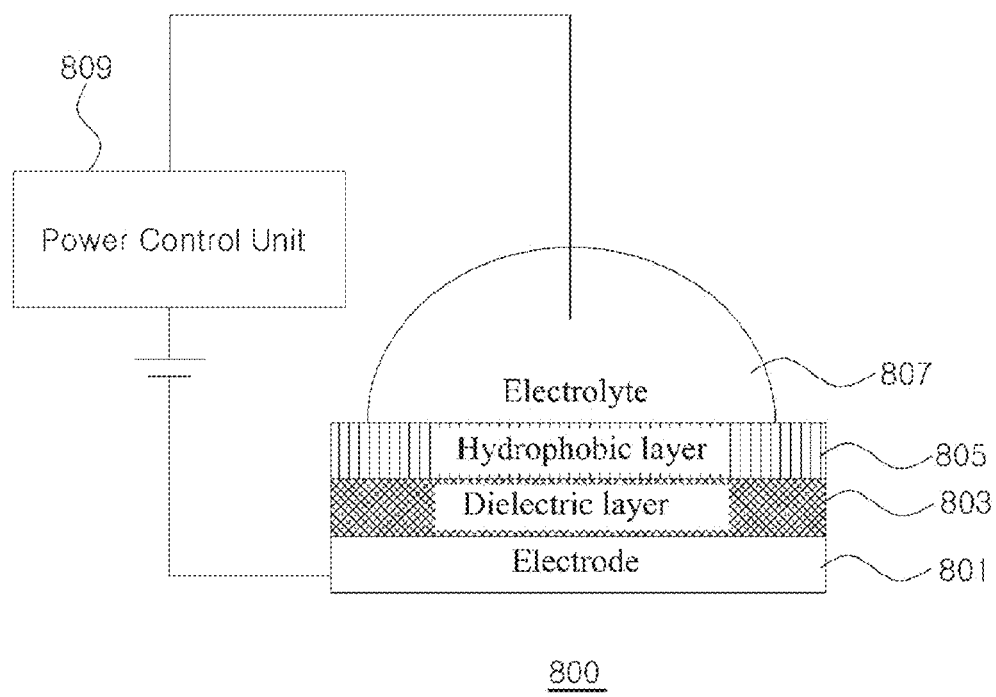
FIG. 8 illustrates an example of an electrowetting device for improving response speed according to an embodiment of the invention.

FIG. 8 illustrates an example of an electrowetting device for improving response speed according to an embodiment of the invention.

The electrowetting device 800 can include an electrode 801, an insulation film 803 that includes a dielectric material and is coated over the electrode 801, a hydrophobic film 805 coated over the insulation film 803, a droplet 807 positioned over the hydrophobic film 805, and a power control unit 809.

The electrode 801 can be formed by a method of deposition, patterning, lift-off, etc., using a material such as indium tin oxide (ITO), metals such as Au/Cr and Al, conductive polymers, etc.

The insulation film 803 may include a dielectric material and may be coated over the electrode 801 such that a surface of the electrode 801 is electrically insulated. The insulation film 803 can include a single layer or continuous layers, and may preferably include one or more material selected from a group consisting of Parylene C, Teflon, and metal oxide films.

The hydrophobic film 805 may be made of a material having a hydrophobic property, and may be coated over the insulation film 803 such that a surface of the insulation film 803 is given a hydrophobic property.

The droplet 807 may have a hydrophilic quality, and the contact angle of the droplet 807 may be changed by a voltage supplied to the electrode 801.

The power control unit 809 may control the contact angle of the droplet 807 by applying different voltages to the electrode 801 according to the contact angle of the droplet 807.

To be more specific, the power control unit 809 may first apply a threshold voltage to the electrode 801 until the contact angle of the droplet 807 desired by the user is created, and when the contact angle of the droplet 807 desired by the user is created, may apply a voltage for maintaining the contact angle of the droplet 807 to the electrode 801.

Thus, at the initial activation of the electrowetting device 800, the threshold voltage may be applied to the electrode 801, so that the contact angle of the droplet 807 desired by the user can be reached within a short time.

According to an embodiment of the invention, the electrowetting device 800 can further include a threshold voltage extractor unit (not shown) that obtains the threshold voltage.

The threshold voltage extractor unit may apply to the electrode 801 a minimal amount of voltage for changing the contact angle of the droplet 807 and check the contact angle of the droplet 807, and afterwards increase the voltage applied to the electrode 801 up to the point where the contact angle of the droplet 807 is no longer changed. Then, the threshold voltage extractor unit may extract the voltage, at the point where the contact angle of the droplet 807 is no longer changed, as the threshold voltage.

According to an embodiment of the invention, the electrowetting device 800 can further include a memory unit (not shown) for storing data related to the changes in contact angle of the droplet 807 according to time when the threshold voltage is applied to the electrode 801. The stored data may include time information related to the times required for creating a particular contact angle when the threshold voltage is applied to the electrode 801. Also, the memory unit can further store data related to voltages for maintaining certain contact angles.

Thus, in order to create a first contact angle desired by the user at a fast speed, the power control unit 809 can apply the threshold voltage to the electrode 801 for a particular time by using the times associated with creating the first contact angle stored in the memory unit, and after the first contact angle is created, can apply to the electrode 801 the voltage for maintaining the first contact angle stored in the memory unit.

Figure 9:
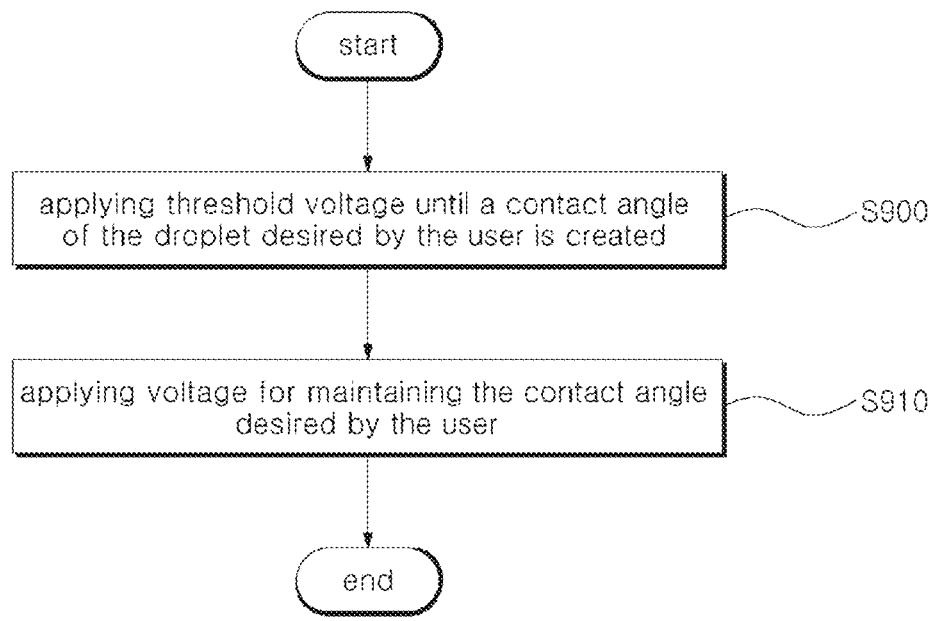
FIG. 9 is a flowchart illustrating an example of a method for improving the response speed of an electrowetting device according to an embodiment of the invention.

FIG. 9 is a flowchart illustrating an example of a method for improving the response speed of an electrowetting device according to an embodiment of the invention.

In operation S900, a threshold voltage may be applied to the electrode 801 until the contact angle of the droplet 807 desired by the user is reached.

Then, when the contact angle of the droplet 807 desired by the user is reached, a voltage for maintaining the contact angle of the droplet 807 desired by the user may be applied to the electrode 801 in operation S910.

Since a higher voltage applied to the electrode 801 in the electrowetting device 800 will result in a more increased speed of the change in contact angle, it is possible to improve the response speed of the electrowetting device 800 by applying a threshold voltage to the electrode 801 at the initial activation of the electrowetting device 800.

According to an embodiment of the invention, the electrowetting device can be applied to a hologram display.

A hologram image refers to a picture that is implemented in 3 dimensions and has a stereoscopic view just as an actual object, and is made by the principle of holography. The principle of holography may involve dividing a laser into two beams, with one beam lighting a screen directly, and the other beam lighting an object which the viewer is trying to see.

Here, the beam directly lighting the screen is referred to as the reference beam, while the beam lighting the object is referred to as the object beam. Since the object beam is the beam that is reflected off each surface of the object, the phase difference (distance from the object surface to the screen) may be different for each surface of the object. Here, the unmodified reference beam interferes with the object beam and the interference pattern is stored on the screen. A film storing this interference pattern is referred to as a hologram.

Figure 10:
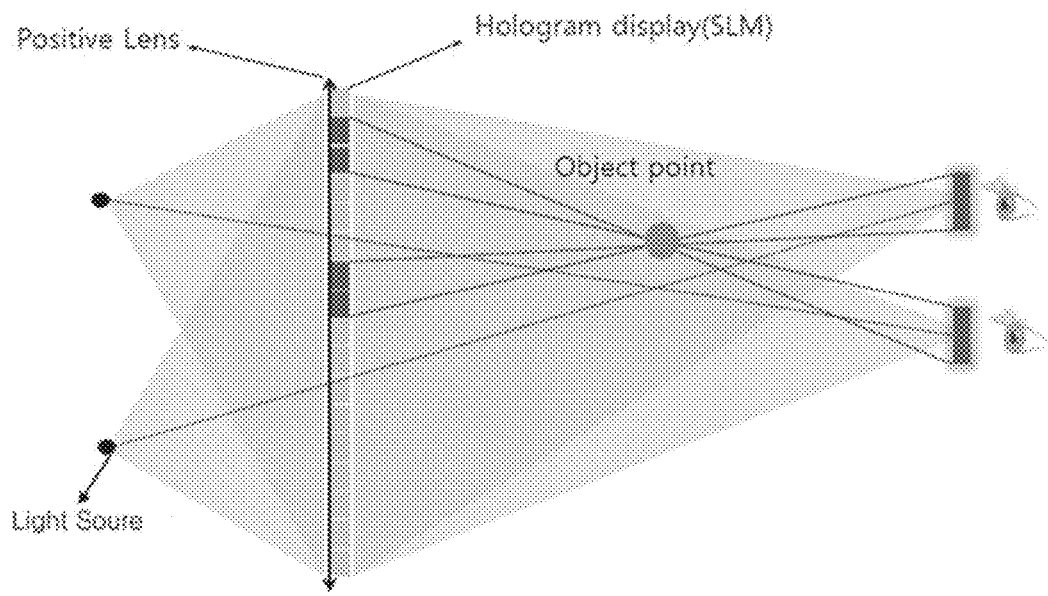
FIG. 10 illustrates an example of a hologram display according to an embodiment of the invention.

FIG. 10 illustrates an example of a hologram display according to an embodiment of the invention.

A beam emitted from a light source may pass the hologram display and light a point where the object is supposed to be located (the object point), and for this, the hologram display may have to adjust the angle of the light source. To implement such angle adjustment, a hologram display can utilize electrowetting.

Figure 11A:
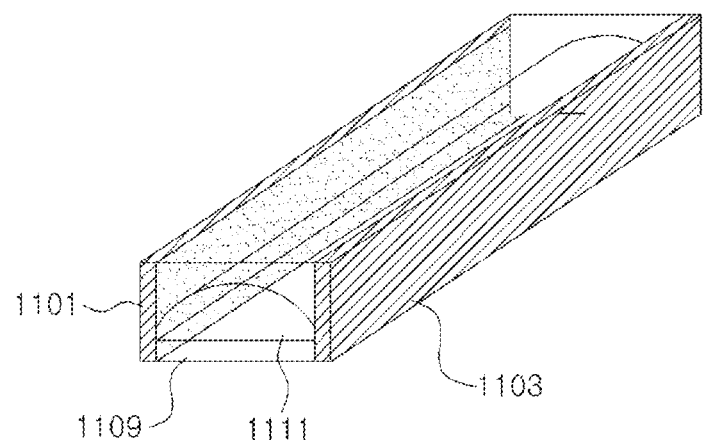
FIG. 11A, FIG. 11B, and FIG. 11C illustrate an example of an electrowetting device for a hologram display according to an embodiment of the invention.
Figure 11B:
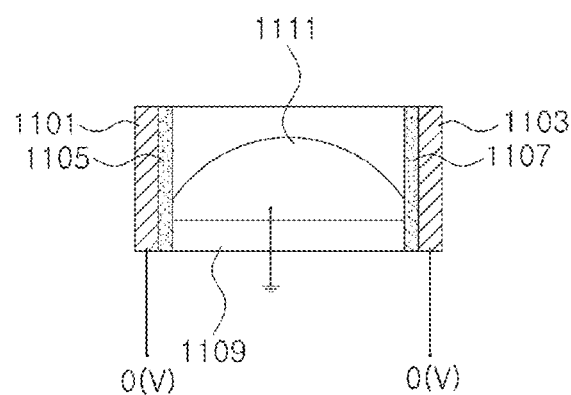
Figure 11C:
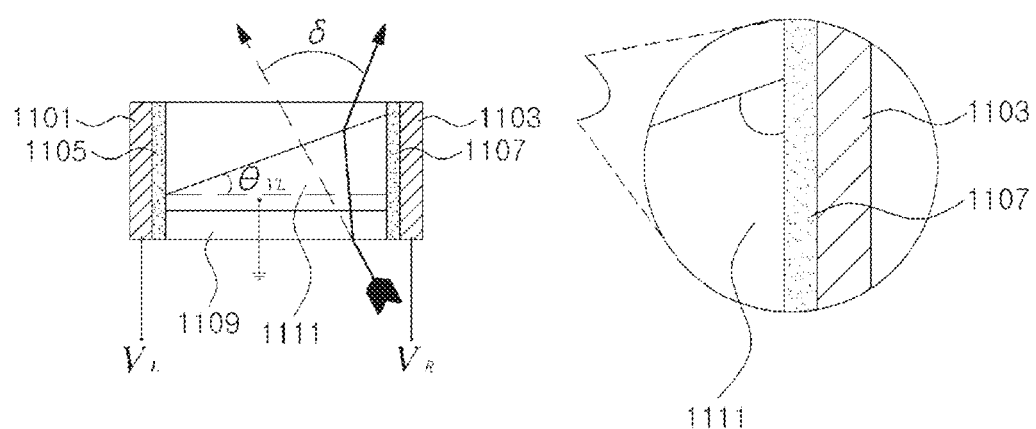

FIG. 11A, FIG. 11B, and FIG. 11C illustrate an example of an electrowetting device for a hologram display according to an embodiment of the invention.

FIG. 11A shows a perspective view of the electrowetting device, while FIG. 11B and FIG. 11C show cross-sectional views of the electrowetting device.

The electrowetting device 1200 for a hologram display may include a first electrode 1101, a second electrode 1103 disposed in a direction facing the first electrode 1101, a first insulation layer 1105 formed covering the first electrode 1101, a second insulation layer 1107 formed covering the second electrode 1103, a support 1109 arranged on a bottom surface between the first electrode 1101 and the second electrode 1103, a droplet 1111 positioned on the support 1109, and a power control unit (not shown).

Here, the first insulation layer 1105, second insulation layer 1107, and support 1109 can include materials having hydrophobic properties.

The power control unit may control the multiple voltages applied to the first electrode 1101 and second electrode 1103, with the droplet 1111 as the ground.

When there is no voltage applied to the first electrode 1101 and second electrode 1103, the droplet 1111 may maintain an elliptical shape as in FIG. 11B, but when a voltage is applied to the first electrode and second electrode, the droplet 1111 may slant in a diagonal direction as in FIG. 11C.

Thus, by adjusting the slope of the droplet 1111, the angle of light passing through the droplet 1111 can be adjusted.

To be more specific, the power control unit may apply a voltage $V_L$ and a voltage $V_R$ to the first electrode 1101 and the second electrode 1103, respectively, such that the sum of the first contact angle ($\theta_{VL}$) of the droplet 1111, formed in the direction where the droplet 1111 touches the first insulation layer 1105, and the second contact angle ($\theta_{VR}$), formed in the direction where the droplet 1111 touches the second insulation layer 1107, is 180°.

Figure 12:
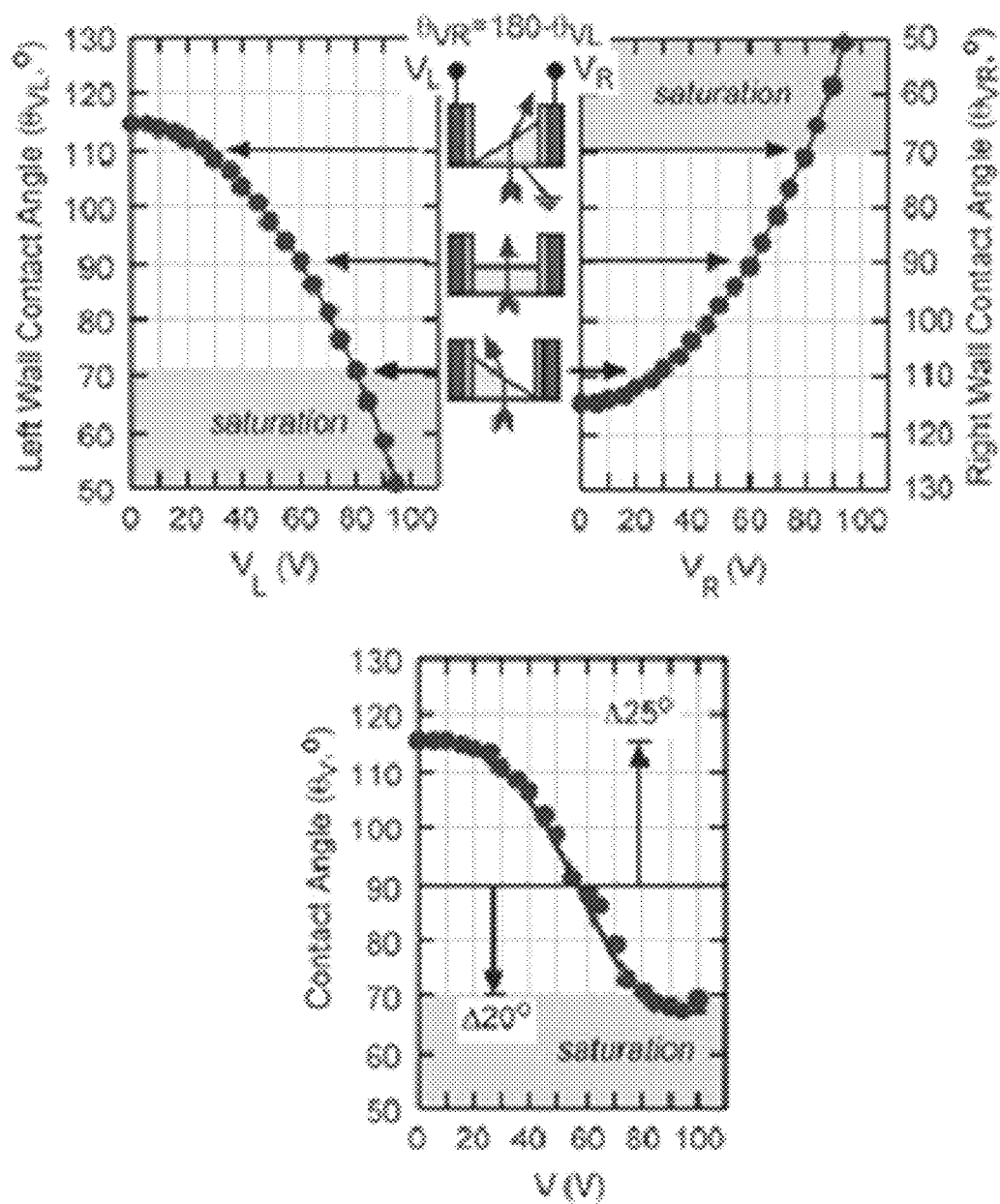
FIG. 12 illustrates examples of voltages applied to an electrowetting device for a hologram display according to an embodiment of the invention.

FIG. 12 illustrates examples of voltages applied to an electrowetting device for a hologram display according to an embodiment of the invention.

The power control unit can refer to the graph of FIG. 12 in applying voltages to the first electrode 1101 and second electrode 1103 such that the sum of the first contact angle and the second contact angle is 180°.

According to an embodiment of the invention, the power control unit, in order to implement a fast response speed for the electrowetting device, can apply a first threshold voltage to the first electrode 1101 until a first contact angle desired by the user is reached, and once the first contact angle is reached, can apply to the first electrode 1101 a voltage for maintaining the first contact angle. Also, the power control unit can apply a second threshold voltage to the second electrode 1103 until a second contact angle desired by the user is reached, and once the second contact angle is created, can apply to the second electrode 1103 a voltage for maintaining the second contact angle.

The first threshold voltage can represent the maximum voltage within a range that does not destroy the first insulation film 1105 or the droplet 1111, while the second threshold voltage can represent the maximum voltage within a range that does not destroy the second insulation film 1107 or the droplet 1111.

By first applying threshold voltages to the first electrode 1101 and second electrode 1103 at the initial activation of an electrowetting device 1100 for a hologram display as described above, it is possible to increase the response speed.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An electrowetting device comprising:
   an electrode;
   an insulation film coated over the electrode, the insulation film comprising a dielectric material;
   a droplet positioned over the insulation film;
   a power control unit configured to control a voltage applied to the electrode; and
   a threshold voltage extractor unit configured to increase a voltage applied to the electrode until a contact angle of the droplet is no longer changed, and extract a voltage applied at a point when the contact angle of the droplet is no longer changed as the first voltage;
   wherein the power control unit reaches a particular contact angle by applying a first voltage higher than a second voltage corresponding to the particular contact angle, and applies the second voltage once the particular contact angle is reached.

2. The electrowetting device of claim 1, wherein the first voltage represents a maximum voltage within a range that does not destroy the insulation film or the droplet.

3. A method for improving a response speed of an electrowetting device, the electrowetting device operating based on an electrowetting principle of modifying a contact angle of a droplet by applying a voltage to an electrode coated with an insulation film, the method comprising:
   applying a first voltage to the droplet until a particular contact angle of the droplet is reached; and
   applying a second voltage to maintain the contact angle of the droplet when the particular contact angle of the droplet is reached,
   wherein the first voltage is higher than the second voltage.

4. An electrowetting device comprising:
   a first electrode;
   a second electrode disposed in a direction facing the first electrode;
   a first insulation layer formed covering the first electrode;
   a second insulation layer formed covering the second electrode;
   a support arranged on a bottom surface between the first electrode and the second electrode;
   a droplet positioned over the support; and
   a power control unit configured to control a voltage applied to the first electrode and the second electrode,
   wherein the power control unit applies multiple voltages to the first electrode for controlling a first contact angle of the droplet formed in a direction of contact between the first insulation layer and the droplet and applies multiple voltages to the second electrode for controlling a second contact angle of the droplet formed in a direction of contact between the second insulation layer and the droplet.

5. The electrowetting device of claim 4, wherein the power control unit applies a first threshold voltage to the first electrode until the first contact angle desired by a user is reached and applies a voltage for maintaining the first contact angle once the first contact angle is reached, and
   the power control unit applies a second threshold voltage to the second electrode until the second contact angle desired by the user is reached and applies a voltage for maintaining the second contact angle once the second contact angle is reached,
   and wherein the first threshold voltage represents a maximum voltage within a range that does not destroy the first insulation film or the droplet, and the second threshold voltage represents a maximum voltage within a range that does not destroy the second insulation film or the droplet.

* * * * *